INVENTOR:
RULON B. BIDDULPH

United States Patent Office 3,576,932
Patented Apr. 27, 1971

3,576,932
SINTERING VAPOR DEPOSITED SILICA ON A MANDREL DESIGNED TO REDUCE SHRINKAGE
Rulon Bruce Biddulph, Dallas, Tex., assignor to Texas Instruments Incorporated, Dallas, Tex.
Filed Feb. 17, 1969, Ser. No. 799,891
Int. Cl. C04b 33/32, 35/14, 35/64
U.S. Cl. 264—57                                5 Claims

ABSTRACT OF THE DISCLOSURE

A process for manufacturing fused silica articles in which silicon dioxide is deposited and vitrified on the same mandrel. Silicon dioxide formed by vapor phase hydrolysis of silicon tetrachloride is deposited on a cylindrical graphite mandrel having reduced diameter portions at one or at each of its ends while the mandrel is at an elevated temperature. The "green" silica article thus formed is then densified on the same mandrel by heat treatment in a vacuum furnace. Interengagement of the silica and the reduced diameter portions of the mandrel prevents shrinkage of the article during heat treatment.

---

This invention relates to the manufacture of articles from small particles of metal oxide powder, and more particularly to forming silicon dioxide particles into fused, glass-like articles.

During the fabrication of certain types of semiconductor devices, it is necessary to "pull" monocrystalline silicon from a melt of pure silicon. Due to the extremely high temperatures required to provide such a silicon melt, it has been found necessary to construct crucibles for the melt from very pure silica in order to prevent impurities from entering the pulled monocrystalline silicon from the crucibles. Further, in order to provide a uniform "pull" from the silicon melt, it has been found necessary to provide silica crucibles having very uniform side walls and very symmetrical configurations in order to prevent sudden changes in the level of the silicon melt during pulling due to irregularities in crucible configuration.

Silica crucibles having the necessary uniform side walls and symmetrical configurations are conveniently formed by depositing silicon dioxide onto a rotating and translating mandrel having the shape of the crucible to be formed. Preferably, the silicon dioxide is formed by vapor phase hydrolysis of silicon tetrachloride in a hydrolysis torch of the type disclosed and claimed in the copending applications of Michael A. Carrell, Ser. No. 744,188, filed July 11, 1968, and Herbert J. Moltzan, Ser. No. 744,153 filed July 11, 1968, operated in the manner disclosed and claimed in the copending application of Carl M. Skooglund, Jr., Ser. No. 808,894, filed Mar. 20, 1969, Crucibles formed in this manner have considerable "green strength" but must be subjected to further heat treatment in order to densify the silicon dioxide particles into a transparent vitreous silica crucible.

Heretofore, heat treatment of green silica crucibles has included the steps of removing the crucibles from their deposition mandrels, placing the crucibles on heat treatment mandrels and heating the crucibles sufficiently to densify the silicon dioxide into fused silica. A suitable mandrel for use in the heat treatment of green silica articles is disclosed in the copending application of Jack Walker, Ser. No. 744,235 filed July 11, 1968. This invention comprises an improvement over previous crucible forming processes which dispenses with the step of removing green silica crucibles from deposition mandrels and placing them on heat treatment mandrels.

In accordance with the preferred embodiment of the invention, metal oxide particles are deposited onto a mandrel having reduced portions at each end. The deposited metal oxide particles are densified on the same mandrel. Interengagement of the metal oxide and the reduced portions of the mandrel prevents shrinkage of the resulting article during heat treatment.

A more complete understanding of the invention may be had by referring to the following detailed description when taken in conjunction with the drawings wherein.

Figure 1:
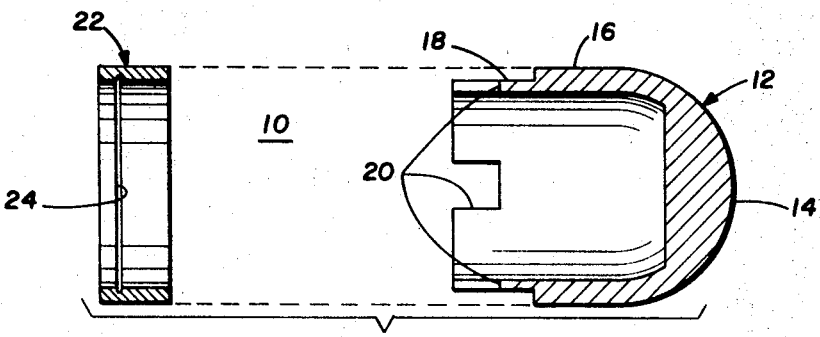
FIG. 1 is an exploded, sectional view of a mandrel useful in the practice of a first embodiment of the invention.

Referring now to the drawings, like reference numerals designate like parts throughout the several views. Referring particularly to FIG. 1, there is shown a mandrel assembly 10 useful in the practice of a first embodiment of the invention. The mandrel assembly 10 includes a mandrel 12 having a generally spherical end 14, a cylindrical main body 16 and a reduced diameter end 18. A plurality of rectangular slots 20 are formed through the reduced diameter end 18 of the mandrel 12. The mandrel 12 is preferably formed from graphite.

The mandrel assembly 10 further includes an annular ring 22 having an inside diameter nearly equal to the outside diameter of the reduced diameter end 18 of the mandrel 12 and having an outside diameter equal to the outside diameter of the main body 16 of the mandrel 12. A circular groove 24 is formed into the interior of the annular ring 22. Like the mandrel 12, the ring 22 is formed from graphite.

The mandrel assembly 10 is assembled by positioning the annular ring 2 on the reduced diameter end 18 of the mandrel 12. When the ring 22 is positioned on the end 18, the groove 24 is positioned in alignment with the slots 20.

In the practice of the first embodiment of the invention, the manufacture of fused silica melt crucibles is commenced by depositing silicon dioxide on the mandrel assembly 10. Preferably, the silicon dioxide is formed by vapor phase hydrolysis of silicon tetrachloride in a hydrolysis torch of the type disclosed in the above-identified Carrel and Moltzan applications and is deposited on the mandrel assembly 10 by operating the torch in the manner disclosed in the above-identified Skooglund application. For example, silicon dioxide can be deposited on the mandrel assembly 10 by positioning a torch of the type shown in FIGS. 2 and 3 of the Carrell application and having a center nozzle aperture of .49 inch at a point 4 inches from the mandrel assembly. Various gases are then supplied to the various components of the torch as follows:

(a) Torch: Oxygen at 1 liter/minute, silicon tetrachloride entrained in the oxygen at 1.56 liters/minute.
(b) Sheath chamber: Oxygen at 1 liter/minute;
(c) Mixing chamber: Oxygen at 5.2 liters/minute, hydrogen at 30 liters/minute.

In such a case, the temperature at a point approximately ¼ inch from the mandrel 10 is in the range of 1,500° C. and the deposition efficiency is about 46%.

Figure 2:
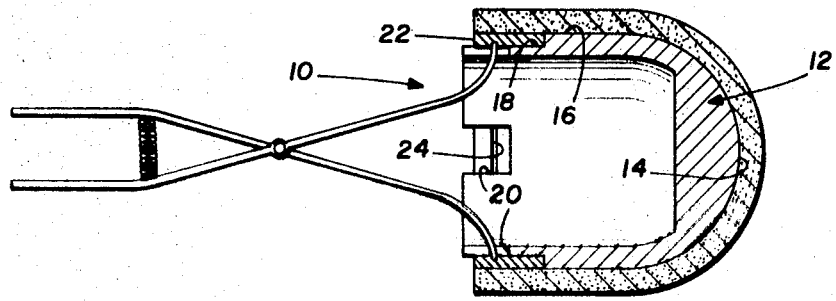
FIG. 2 is a sectional view illustrating the practice of the first embodiment of the mandrel.

Deposition of silicon dioxide on the mandrel assembly 10 results in the formation of a porous "green" silica curcible of the type shown in FIG. 2 on the mandrel assembly 10. When the formation of the green silica crucible has been completed, the annular ring 22 of the mandrel assembly 10 is removed from the mandrel 12. This is accomplished by inserting a suitable tool, such as the pliers illustrated in FIG. 2, into the groove 24 of the ring 22 and withdrawing the ring 22 axially of the mandrel 12.

After the annular ring 22 has been removed, the mandrel 12 is inserted into a vacuum furnace wherein the temperature of the green silica crucible on the mandrel 12 is raised to between 1,350° C. and 1,650° C. The heating of the green silica crucible sinters or densifies the silicon dioxide particles thereof into a non-porous, vitreous structure suitable for use as a melt crucible. Unfortunately, however, the application of heat to porous green silica articles also tends to shrink the articles. In the past, this shrinkage has resulted in sufficient distortion of finished crucibles to render them useless as melt crucibles for use in semiconductor manufacture.

When a green silica crucible of the type shown in FIG. 2 is heated on the mandrel 12, the initial shrinkage of the crucible occurs simultaneously in the radial, circumferential and axial directions. This causes the silicon dioxide that was deposited on the ring 24 of the mandrel assembly 10 during the deposition operation to shrink into engagement with the reduced diameter end 18 of the mandrel 12.

Interengagement of the material of the green crucible with the reduced diameter end 18 and the spherical end 14 of the mandrel 12 restricts subsequent shrinkage of the green crucible axially with respect to the main body 16 of the mandrel 12. Thus, the interior dimensions of the crucible are maintained identical to the exterior dimensions of the main body 16 and the spherical end of the mandrel 12 during the entire heating operation.

When the heat treatment of the crucible is completed, the fused silica engaged with the reduced end 18 of the mandrel 12 is severed from the remainder of the crucible. The portions of the crucible that were engaged with the main body 16 and the spherical end 14 of the mandrel 12 are then used as a melt crucible.

Figure 3:
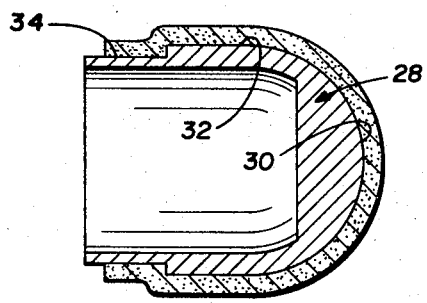
FIG. 3 is a sectional view illustrating the practice of a second embodiment of the invention.

Referring now to FIG. 3, it has been found that in some manufacturing operations the use of the annular ring 22 of mandrel assembly 10 can be dispensed with. In such operations, silicon dioxide is deposited directly onto a mandrel 28. The mandrel 28 is similar to the mandrel 12 of the mandrel assembly 10 in that it is formed from graphite and is comprised of a spherical end 30, a cylindrical main body 32 and a reduced end 34. When the mandrel 28 is employed, the silicon dioxide is deposited directly onto the reduced end 34 as well as the main body 32 and the spherical end 30 of the mandrel. Such deposition results in the formation of a green silica crucible of the type illustrated in FIG. 3.

Figure 4:
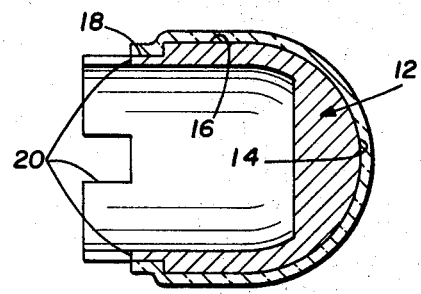
FIG. 4 is the sectional view illustrating the practice of the first and second embodiments of the invention.

Upon completion of the deposition of a green crucible, the mandrel 28 is transferred to a densification furnace. The temperature of the green crucible is then raised in a rarified atmosphere to between 1,350° C. and 1,650° C. This densifies or sinters the green crucible into a finished crucible similar to the fused silica crucible shown in FIG. 4. During the heat treatment of the crucible the interengagement of the silicon dioxide with the reduced end 34 and the spherical end 30 of the crucible 28 prevents axial shrinkage of the crucible with respect to the main body 32. Like the crucible formed in the first embodiment, the crucible formed in the second embodiment is completed by severing the portion of the finished crucible engaged with the reduced end 34 of the mandrel 28 from the remainder of the crucible.

Figure 5:
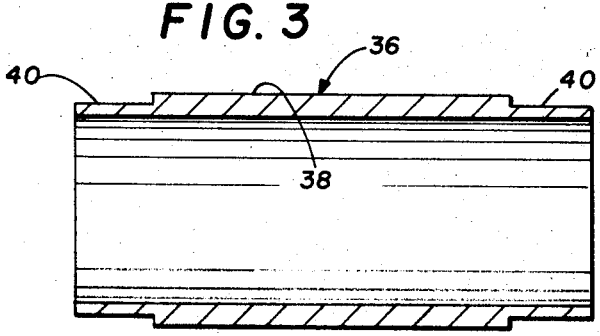
FIG. 5 is a sectional view of a mandrel useful in the practice of a third embodiment of the invention.

Referring now to FIG. 5, a mandrel 36 useful in the practice of a third embodiment of the invention is illustrated. The mandrel 36 is entirely cylindrical in shape and is comprised of a large diameter main body 36 and two reduced diameter ends 40 which extend from each end of the main body 38. In use, silicon dioxide is deposited over the entire length of the mandrel 36. That is, a green silica article is formed from one of the reduced ends 40 of the mandrel 36 over the entire length of the main body 38 thereof to the other reduced end 40.

After completion of the formation of a green article, the mandrel 36 is transferred to a vitrification furnace. In the furnace, the temperature of the green article is raised in a vacuum to between 1,350° C. and 1,650° C. This transforms the green silica article into a non-porous, vitreous fused silica article. During the heat treatment, the interengagement of the material of the green article with the reduced ends 40 of the mandrel 36 prevent axial shrinkage of the article with respect to the main body 38 of the mandrel 36.

After heat treatment of the article is completed, the fused silica article is finished by severing the portions thereof engaged with the reduced ends 40 of the mandrel 36 from the portion thereof engaged with the main body 38 of the mandrel 36. The resulting article is a hollow tube formed from fused silica.

The invention illustrated in the drawing comprises an improvement over prior fused silica article forming processes in that it dispenses with the use of separate mandrels for the deposition and vitrification steps of such processes. Instead, the same mandrel is used to receive silica dioxide particles from a vapor phase hydrolysis torch and to support the resulting green silica article during heat treatment thereof.

Although only three embodiments of the invention are illustrated in the drawing and described in the foregoing specification, it will be understood that the invention is not limited to the embodiments disclosed but is capable of rearrangement, modification and substitution of parts and elements without departing from the spirit of the invention.

What is claimed is:

1. In a process for manufacturing fused silica articles of the type including the steps of forming a silicon dioxide layer by vapor phase hydrolysis of a silicon halide gas on a graphite deposition mandrel, said mandrel being heated to an elevated temperature by said forming step, and sintering the layer to form a fused silica article, the improvement characterized by:

building up a metal oxide layer on a graphite deposition mandrel having a central portion defining a relatively large diameter and end portions having a diameter smaller than the diameter of said central portion, said silicon dioxide layer covering said central portion and engaging said reduced diameter end portions;

sintering in a vacuum furnace said silicon dioxide layer on said deposition mandrel to form a fused silica article, said reduced diameter end portions and said silicon dioxide layer interengaging to restrain said article from shrinking; and severing a portion of said fused silica in a region of said central portion adjacent one of said reduced diameter end portions to facilitate removal of said article from said deposition mandrel.

2. The process for manufacturing fused metal oxide articles according to claim 1 wherein the layer building step is carried out by forming a layer of silica dioxide particles on the deposition mandrel.

3. The process for manufacturing fused metal oxide articles according to claim 2 wherein the sintering step is carried out by heating the silicon dioxide particles to between 1350° C. and 1650° C.

4. The process for manufacturing fused metal oxide articles according to claim 1 wherein the severing step is further characterized by separating the portion of the fused metal oxide article engaged with one end surface of the deposition mandrel and with the central portion thereof from the portion engaged with the other end surface and thereafter removing the two portions from the deposition mandrel.

5. A process for manufacturing fused silica crucibles including the steps of:

building up a layer of silicon dioxide by vapor phase hydrolysis of a silicon halide gas on a graphite mandrel, said mandrel being heated to an elevated temperature by said building up step, including a crucible shaped portion at one end thereof, a central portion having a uniform diameter corresponding to the diameter of said crucible shaped portion, and a reduced diameter portion at the other end of said mandrel, said layer engaging said crucible shaped portion of said mandrel and said reduced diameter portion;

sintering said silicon dioxide layer on said mandrel in a vacuum furnace at a temperature in the range of 1350° C. to 1650° C. to form a fused silica article, interengagement of said layer with said reduced diameter portion and crucible shaped portion of said mandrel restraining said article from shrinking; and separating the portion of said article engaged with the crucible shaped portion of the mandrel from the portion engaged with the reduced diameter portion in a region of said central portion adjacent said reduced diameter portion.

References Cited

UNITED STATES PATENTS

| | | | |
|---|---|---|---|
| 1,456,960 | 5/1923 | Austin | 264—Shrink Digest |
| 1,648,149 | 11/1927 | Reeve | 264—Destruct Mold Digest |
| 1,877,424 | 9/1932 | Fear | 25—153 |
| 2,306,433 | 12/1942 | Gednetz | 25—153 |
| 2,657,447 | 11/1953 | Pellanda, Jr. | 25—128 |
| 2,974,388 | 3/1961 | Ault | 25—156 |
| 2,992,457 | 7/1961 | Harrison | 18—59 |
| 3,140,193 | 7/1964 | Kane | 117—8 |
| 3,265,519 | 8/1966 | Diefendorf | 117—8 |
| 3,396,220 | 8/1968 | Dewsnap et al. | 264—66 |
| 2,272,342 | 2/1942 | Hyde | 65—22 |

JULIUS FROME, Primary Examiner

J. H. MILLER, Assistant Examiner

U.S. Cl. X.R.

117—23, 107.2; 264—65, 81, 332